United States Patent
Lobert et al.

(10) Patent No.: US 10,301,427 B2
(45) Date of Patent: May 28, 2019

(54) PROCESS FOR PRODUCING HYDROSILYLABLE POLYOXYALKYLENE ETHERS

(71) Applicant: Evonik Degussa GmbH, Essen (DE)

(72) Inventors: Matthias Lobert, Essen (DE); Volker Zellmer, Bottrop (DE); Anja Brösgen, Essen (DE); Thomas Reibold, Herten (DE)

(73) Assignee: Evonik Degussa GmbH, Essen (DE)

( * ) Notice: Subject to any disclaimer, the term of this patent is extended or adjusted under 35 U.S.C. 154(b) by 14 days.

(21) Appl. No.: 15/863,156

(22) Filed: Jan. 5, 2018

(65) Prior Publication Data

US 2018/0230268 A1  Aug. 16, 2018

(30) Foreign Application Priority Data

Feb. 10, 2017 (EP) .................................. 17155523

(51) Int. Cl.
| | |
|---|---|
| *C08G 65/324* | (2006.01) |
| *C08G 65/26* | (2006.01) |
| *C08G 65/30* | (2006.01) |
| *C08G 65/336* | (2006.01) |
| *C08G 65/337* | (2006.01) |
| *C08L 71/02* | (2006.01) |

(52) U.S. Cl.
CPC ....... *C08G 65/324* (2013.01); *C08G 65/2603* (2013.01); *C08G 65/2609* (2013.01); *C08G 65/30* (2013.01); *C08G 65/336* (2013.01); *C08G 65/337* (2013.01); *C08L 71/02* (2013.01); *C08G 2650/30* (2013.01); *C08G 2650/58* (2013.01)

(58) Field of Classification Search
None
See application file for complete search history.

(56) References Cited

U.S. PATENT DOCUMENTS

| | | | |
|---|---|---|---|
| 5,093,376 A | 3/1992 | Moehring et al. | |
| 5,132,333 A | 7/1992 | Burkhart et al. | |
| 5,183,830 A | 2/1993 | Moehring et al. | |
| 5,306,737 A | 4/1994 | Burkhart et al. | |
| 5,321,051 A | 6/1994 | Burkhart et al. | |
| 5,357,018 A | 10/1994 | Burkhart et al. | |
| 5,480,916 A | 1/1996 | Bruene-Fischer et al. | |
| 5,565,194 A | 10/1996 | Burkhart et al. | |
| 5,633,292 A | 5/1997 | Bruene et al. | |
| 6,194,475 B1 | 2/2001 | Boinowitz et al. | |
| 7,312,364 B2 | 12/2007 | Cramers et al. | |
| 8,058,388 B2 | 11/2011 | Sellmann et al. | |
| 8,268,939 B2 | 9/2012 | Ebbrecht et al. | |
| 8,283,422 B2 | 10/2012 | Schubert et al. | |
| 8,883,932 B2 | 11/2014 | Brugger et al. | |
| 9,035,011 B2 | 5/2015 | Ferenz et al. | |
| 9,051,424 B2 | 6/2015 | Lobert et al. | |
| 9,334,354 B2 | 5/2016 | Ferenz et al. | |
| 9,534,158 B2 * | 1/2017 | Fujimoto | C09J 171/02 |
| 9,550,928 B2 | 1/2017 | Lobert et al. | |
| 9,555,148 B2 | 1/2017 | Wattebled et al. | |
| 2004/0186260 A1 | 9/2004 | Hohenberg et al. | |
| 2008/0045667 A1 | 2/2008 | Snell et al. | |
| 2012/0028022 A1 | 2/2012 | Brugger et al. | |
| 2013/0035407 A1 | 2/2013 | Lobert et al. | |
| 2014/0312273 A1 | 10/2014 | Wattebled et al. | |
| 2016/0311963 A1 | 10/2016 | Lobert et al. | |
| 2017/0065951 A1 | 3/2017 | Roland et al. | |
| 2017/0218120 A1 | 8/2017 | Brandt et al. | |
| 2017/0226285 A1 | 8/2017 | Lobert et al. | |
| 2017/0240692 A1 | 8/2017 | Roland et al. | |
| 2017/0283554 A1 | 10/2017 | Lobert et al. | |
| 2018/0016392 A1 | 1/2018 | Lobert et al. | |

FOREIGN PATENT DOCUMENTS

| | | |
|---|---|---|
| DE | 4138166 C1 | 10/1992 |
| EP | 0532939 A1 | 3/1993 |
| EP | 1685896 A1 | 8/2006 |
| EP | 1889865 A1 | 2/2008 |
| EP | 3050910 A1 | 8/2016 |
| EP | 3228649 A1 | 10/2017 |
| JP | 2007204701 A | 8/2007 |
| WO | 2010063531 A1 | 6/2010 |
| WO | 2012130674 A2 | 10/2012 |
| WO | 2013017365 A1 | 2/2013 |
| WO | 2016120023 A1 | 8/2016 |
| WO | 2017174272 A1 | 10/2017 |

OTHER PUBLICATIONS

European Search Report dated Jul. 6, 2017 in EP 17 155 523.8 (6 pages).

* cited by examiner

*Primary Examiner* — Clinton A Brooks
*Assistant Examiner* — Kofi Adzamli
(74) *Attorney, Agent, or Firm* — Philip P. McCann; Nexsen Pruet PLLC

(57) ABSTRACT

Described are a process for producing hydrosilylable polyoxyalkylene ethers, comprising the steps of (1) alkoxylation of at least one terminally unsaturated alcohol with alkylene oxides to afford a polyoxyalkylene ether, (2) etherification of the polyoxyalkylene ether from step (1) and (3) neutralization of the product from step (2) under buffered conditions, and hydrosilylable polyoxyalkylene ether mixtures.

14 Claims, No Drawings

PROCESS FOR PRODUCING HYDROSILYLABLE POLYOXYALKYLENE ETHERS

This application claims the benefit of European Application No. 17155523.8 filed on Feb. 10, 2017, the disclosure of which is expressly incorporated herein by reference.

FIELD

The invention relates to a process for producing hydrosilylable polyoxyalkylene ethers. It further relates to certain allylpolyoxyalkylene ether mixtures.

BACKGROUND

Polyethers are important industrial intermediates. Use as a constituent of surface-active molecules such as polyether siloxanes may be mentioned for example.

Polyether siloxanes have long been known in the prior art and are produced inter alia by the reaction of an SiH-functional polysiloxane with one or more unsaturated polyethers. In this transition metal-catalysed SiC linkage (Pt catalysts are advantageously used for example) of these two species quality requirements for the polyether to be hydrosilylized in terms of purity and reactivity are very high in order to allow as complete as possible a reaction of the SiH groups of the polysiloxane.

Particularly the etherification and the workup of the polyethers is beset by problems. Thus, for example, long-term thermal stress in the strongly alkaline medium (for example in the presence of sodium methoxide or NaOH) results in a partial isomerization of the allyl group of the polyoxyalkylene ether to afford the propenyl group owing to the process. The propenyl groups are then decomposed on up to a quantitative scale during the neutralization. This additionally releases propionaldehyde which is a health hazardous and odorous substance which can also have a negative effect on the reactivity of the polyether during the hydrosilylation reaction.

SUMMARY

In this context there is always a requirement for polyethers which in the context of hydrosilylation are virtually fully convertible, preferably result in >99 mol % SiH conversion, and for processes for producing same to allow a stable synthesis of various downstream products of constant good quality, in particular those without terminal OH groups.

It is an object of the present invention to make it possible to provide such polyethers.

This problem is solved by the subject matter of the present invention.

DETAILED DESCRIPTION

The present invention therefore provides a process for producing hydrosilylable polyoxyalkylene ethers, comprising the steps of
1. alkoxylation of at least one terminally unsaturated alcohol with alkylene oxides to afford a polyoxyalkylene ether,
2. etherification of the polyoxyalkylene ether from step (1) and
3. neutralization of the product from step (2) under buffered conditions.

Step (1) of the process according to the invention, the alkoxylation of unsaturated alcohols, is well known in the prior art and may be performed by any desired known process, such as described in the literature. Reference is made to *Alkylene Oxides and their polymers*, F. E. Bailey, Taylor & Francis Inc., 1991 and *Ullmann's Encyclopedia of Industrial Chemistry* as exemplary literature.

The alkoxylation of OH-functional starter compounds can be effected under base, acid, or transition metal catalysis. It is preferable when process step (1) is performed under base catalysis which corresponds to a preferred embodiment of the present invention.

Step (1) also comprehends the use of mixtures of terminally unsaturated alcohols with saturated alcohols.

Step (2) of the process according to the invention, the etherification of polyoxyalkylene ethers, is also well known from the prior art. The principle of Williamson's synthesis from alkali metal alkoxide and alkyl chlorides (Methoden der organischen Chemie, Houben-Weyl, vol. VI/3, 1965 edition) is preferably used.

Exemplary patent literature elaborating on the etherification step of polyoxyalkylene ethers with alkyl halides includes DE 4138166 C1, JP 2007204701 A, EP 1889865 A1 and EP 1685896 A1. The former documents further describe the workup of the product after etherification by addition of acids/dilute acid followed by removal of the water by distillation and filtration of salts.

The present process according to the invention makes a decisive departure from this teaching when a neutralization is performed under buffered conditions. It is preferable when in step (3) according to the invention the product from step (2) is admixed with a buffer solution, in particular aqueous buffer solution, before the acid addition.

Such a procedure makes it possible to retain the propenyl groups of the etherified polyoxyalkylene ether.

Preferred embodiments of the process according to the invention shall be described more particularly hereinbelow.

In process step (1) of the process according to the invention any hydroxyl-functional, aliphatic unsaturated compounds may in principle be employed as starters for the alkoxylation reaction. Preferably employable as starters for the alkoxylation reaction are mono-hydroxyl-functional, aliphatic terminally unsaturated compounds. More preferably employable as starters for the alkoxylation reaction are mono-hydroxyl-functional, aliphatic terminally unsaturated compounds. Particularly preferably employable are allyl alcohol, 2-allyloxyethanol, 5-hexen-1-ol and 10-undecen-1-ol. Allyl alcohol is especially preferably employable. Also employable are the corresponding methallyl compounds, for example methallyl alcohol or methallyl polyalkylene oxides. When reference is made in the context of this invention to allylic starter compounds, this term also comprehends the methallylic analogs without this needing to be addressed specifically. If the term "(meth)allylic" is used it comprehends both "allylic" and "methallylic".

Employable alkylene oxides generally include all alkylene oxides known to those skilled in the art, in pure form or in any desired mixtures. Preferably employable are ethylene oxide, propylene oxide, 1,2-butylene oxide, 2,3-butylene oxide, isobutylene oxide, 1-octene oxide, 1-decene oxide, 1-dodecene oxide, 1-tetradecene oxide, 1-hexadecene oxide, 1-octadecene oxide, C20/28-epoxide, α-pinene epoxide, cyclohexene oxide, 3-perfluoroalkyl-1,2-epoxypropane and styrene oxide. Particularly preferred are ethylene oxide, propylene oxide, 1-dodecene oxide and styrene oxide. Very particularly preferred are ethylene oxide and/or propylene oxide.

The relevant alkylene oxides may after reaction result in the fragments having index a defined in formulae (1a) and (1b). Formulae (1a) and (1b) are reported below.

Employable glycidyl ethers include alkyl-, aryl-, alkaryl- or alkoxy-substituted glycidyl ethers. The term "alkyl" here preferably represents linear or branched alkyl or alkenyl radicals having 1 to 30, preferably 1 to 12 and preferably 2 to 8 carbon atoms. The term "alkyl" particularly preferably represents a methyl, ethyl, propyl, butyl, tert-butyl, 2-ethylhexyl, allyl or a $C_{12}$-$C_{14}$ radical. The term "aryl" preferably represents a phenyl radical (phenyl glycidyl ether) and the term "alkaryl" preferably represents an o-cresyl, p-tert-butylphenyl or benzyl radical (o-cresyl glycidyl ether, p-tert-butylphenyl glycidyl ether or benzyl glycidyl ether). The term "alkoxy" preferably represents methoxy, ethoxy, propoxy, butoxy and/or phenylethoxy and comprehends from 1 to 30 alkoxy units which may also be a combination of two or more different alkoxy units. Also employable as glycidyl ethers are polyfunctional glycidyl ethers such as 1,4-butanediol diglycidyl ether, 1,6-hexanediol diglycidyl ether, cyclohexane dimethanol diglycidylether, neopentyl glycol diglycidyl ether, polyethylene glycol diglycidyl ether, polypropylene glycol diglycidyl ether, polyglycerol-3-glycidyl ether, glycerol triglycidyl ether, trimethylolpropane triglycidyl ether or pentraerythritol tetraglycidyl ether. The use of such tri- or tetra-functional monomers results in the construction of the branched structural element. The relevant glycidyl ethers may after reaction result in the fragments having index b defined in formulae (1a) and (1b). Formulae (1a) and (1b) are reported below.

Further preferred embodiments of process step (1) are described hereinbelow:

In the process according to the invention in step (1) the reaction is preferably effected such that initially the starter is at least partly deprotonated by alkali metal hydroxide or alkoxide, preferably sodium hydroxide and/or potassium hydroxide/sodium methoxide and/or potassium methoxide. The employed amount of alkali metal hydroxides or alkoxides is by preference from 1 to 40 mol %, and preferably 3 to 15 mol %, based on the moles of OH of the starter.

Alkali metal hydroxides and/or alkoxides may be supplied to the reaction vessel in solid or dissolved form (for example dissolved in water or low molecular weight alcohols). The hydrolysis alcohol and/or any solvent present may be removed by distillation prior to commencement of the actual alkoxylation.

The thus obtained mixture which according to the starter used preferably contains alcohols and alkoxides is reacted with reactants suitable for ring-opening polymerization, preferably alkylene oxides preferably at a temperature between by preference 60° C. and 200° C., preferably from 90° C. to 170° C. and particularly preferably from 100° C. to 130° C. The reaction is by preference effected at pressures in the range from 0.001 to 100 bar, preferably in the range from 0.005 to 10 bar and very particularly preferably from 0.01 to 5 bar (all absolute pressures).

The reaction of the reactants suitable for ring-opening polymerization, preferably of alkylene oxide, in process step (1) may optionally be followed by a deodorizing step to remove traces of unconverted reactants suitable for ring-opening polymerization, preferably alkylene oxides, and any byproducts formed. In such a deodorizing step the reactor is preferably evacuated at the temperature of process step (1), preferably to a vacuum of not more than 100 mbar, particularly preferably to a vacuum of not more than 60 mbar and particularly preferably to a vacuum of not more than 30 mbar.

Alternatively the deodorization may also be performed by any desired processes from the prior art, for example by introduction of stripping gas.

Preferred embodiments of process step (2) are described hereinbelow:

In process step (2) of the process according to the invention, the etherification step of the polyoxyalkylene ether from step (1) takes place, wherein preferably aliphatic optionally unsaturated alkyl halides are employed as alkylation reagents. Preferably employable are alkyl chlorides, alkyl bromides or else unsaturated compounds such as allyl chlorides or allyl bromides. Very particularly preferably employable are alkyl chlorides such as methyl chloride or butyl chloride, very particularly preferably methyl chloride.

In process step (2) of the process according to the invention the product obtained from step (1) is preferably initially admixed with excess alkali metal alkoxide and/or alkali metal hydroxide as per the prior art to effect quantitative conversion of the terminal OH groups of the product into the hydroxyl ions (polyether alkoxide).

Alkali metal hydroxides and/or alkoxides may be supplied to the reaction vessel in solid or dissolved form (for example dissolved in water or low molecular weight alcohols).

It is preferable when sodium methoxide or sodium hydroxide are used to effect quantitative conversion of the terminal OH groups of the product into the hydroxyl ions (polyether alkoxide).

The term "excess" sodium methoxide or sodium hydroxide relates to the molar ratio of the base having regard to the polyether alkoxide formed.

The reaction is performed in particular at temperatures from 70° C. to 150° C., preferably 100° C. to 130° C., wherein in the course of the reaction alcohol (for example methanol when methoxides are used) or water (for example when hydroxides are used) are liberated, which may be drawn off under vacuum. When a vacuum is applied, the pressure falls as the reaction progresses. Upon reaching a pressure of preferably less than 20 mbar, the reaction is terminated. Advantageously, an excess of alkyl chloride is then added and the etherification is performed. When methyl chloride is used, a pressure preferably in the range of 200 to 1300 mbar is thus established.

The procedure described in the preceding paragraph, consisting of distillation step and alkylation step, may optionally be repeated to achieve higher degrees of etherification.

In particular a quantitative degree of etherification (>99%) is sought and is also attainable with the process according to the invention. However, it is preferable when at least 90% of the terminal groups are not —OH but rather —OR$^4$ where R$^4$ are independently of one another an alkyl group having 1 to 8 carbon atoms, which may optionally be branched, and/or an unsaturated aliphatic group.

Having regard to the preferred embodiment of process step (2), reference is made in particular to the disclosure of EP 1685896 A1 and to the preferred employability of a loop reactor.

Preferred embodiments of process step (3) are described hereinbelow:

In process step (3) of the process according to the invention, the product obtained from step (2) is neutralized under buffered conditions.

The product from step (2) may initially be diluted with water before the buffered neutralization which corresponds to a preferred embodiment of the invention or else neutralized directly by addition of a buffer solution, preferably aqueous buffer solution, followed by an amount of acid which likewise corresponds to a preferred embodiment of the invention. Moreover, in a further preferred embodiment of the process it is also possible after the addition of water and before the buffered neutralization to remove the aqueous phase.

Employable buffer systems generally include both inorganic and organic buffer systems. It is preferable to employ inorganic buffer systems.

It is preferable to employ aqueous buffer solutions. The buffering range of the buffer solutions used may be varied within wide limits. Examples of advantageously employable buffer solutions and the pH ranges thereof are for example carbonic acid-carbonate buffer (buffering range: pH 6.2 to 8.6; neutral), carbonic acid-silicate buffer (pH 5.0 to 6.2), acetic acid/acetate buffer (pH 3.7 to 5.7), phosphate buffer (pH 5.4 to 7.8), MES (2-(N-morpholino)ethansulfonic acid) (pH 5.2 to 6.7).

The buffer solution advantageously employable in the process according to the invention may have a buffering range between pH 3.5 and 9.0; particularly preferably said solution has a buffering range between pH 4.5 and 8.5, especially preferably a buffering range between pH 5.0 and 8.0. The buffer solution advantageously comprises phosphate as the buffer substance, preferably in the form of hydrogenphosphate and/or dihydrogenphosphate.

The product from step (2) may in particular be admixed with a sufficient amount of sodium dihydrogen phosphate solution before the neutralization.

The concentration of the buffer solution, such as in particular the sodium dihydrogen phosphate solution, is freely choosable for the specific case by the user. The concentration of the buffer solution, preferably sodium dihydrogen phosphate solution, is preferably between 1 and 46 wt %, particularly preferably 15 to 40 wt %, especially preferably between 25-35 wt %.

The optimal amount of buffer solution used is to be adapted to the respective application and is choosable within wide limits. In each case the minimum amount is to be measured such that a sufficient buffering effect in the respective reaction mixture to be neutralized is effected. Those skilled in the art are able to determine this quickly using just a few bench experiments.

The buffer solution is preferably employed in amounts of 0.5 to 100 parts by weight, particularly preferably in amounts of 1 to 50 parts by weight and in particular in amounts of 2 to 20 parts by weight, in each case based on 100 parts by weight of the products obtained from step (2). It is in principle also possible, but less preferable due to ineconomy, to employ amounts of buffer solution greater than 100 parts by weight.

The neutralization may also be effected by addition of any acid. Preferably employable are inorganic acids such as mineral acids. Particularly preferably employable are hydrochloric acid, sulfuric acid or phosphoric acid, in particular phosphoric acid.

The amount of the added acid is in particular to be adapted such that in process step (3) the mixture is adjusted to a pH of 4 to 7 before water and salts are removed. The pH is particularly preferably adjusted to 4.5 to 6.

Finally, water and salts may be removed by any desired industrial processes. It is preferable when initially the water is removed by distillation under vacuum and subsequently the precipitated salts are quantitatively removed by filtration.

The polyethers produced by the process according to the invention therefore feature a very good reactivity in the context of hydrosilylation which is superior even to a polyether free from propenyl groups. Furthermore, retaining the propenyl group has the result that the liberation of propionaldehyde is avoided which leads to ecotoxicological advantages and enables production of a product that is more advantageous in terms of odour.

Upon reaction with a hydropolysiloxane in the presence of suitable transition metal catalysts (for example platinum catalysts), the products afford yields of >99% and allow production of highly effective surface-active substances.

It corresponds to a preferred embodiment of the invention when the process according to the invention is used for producing mixtures of hydrosilylable polyoxyalkylene ethers, in particular comprising hydrosilylable propylene-containing polyoxyalkylene ethers.

In the alkoxylation of a terminally unsaturated alcohol and/or the subsequent etherification reaction (as mentioned at the outset), a rearrangement of a fraction of the double bond from the terminal position (a position) to the thermodynamically more stable internal position (ft position) always takes place and it is therefore an inherent feature of the process that polyether mixtures are always formed.

A process according to the invention for producing hydrosilylable polyoxyalkylene ether mixtures comprising compounds of general formulae (1a) and (1b),

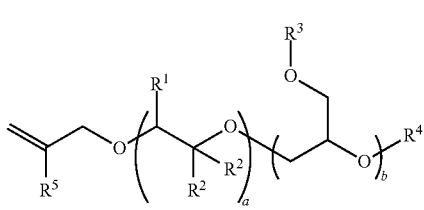

Formula (1a)

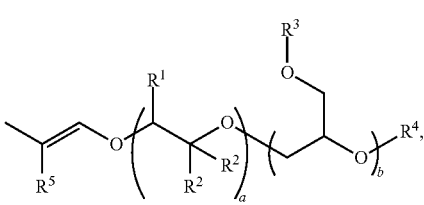

Formula (1b)

where
$R^1$=independently at each occurrence a hydrogen radical or an alkyl group having 1 to 8 carbon atoms, preferably hydrogen, methyl or ethyl, especially preferably hydrogen,
$R^2$=independently at each occurrence a hydrogen radical, an alkyl group having 1 to 20 carbon atoms, an aryl or alkaryl group, preferably hydrogen, methyl, ethyl, octyl, decyl, dodecyl, phenyl, benzyl, particularly preferably hydrogen, methyl or ethyl, or
$R^1$ and one of the $R^2$ radicals may together form a ring which includes the atoms to which $R^1$ and $R^2$ are bonded; this ring preferably comprises 5 to 8 carbon atoms,
$R^3$=independently at each occurrence a saturated or unsaturated, aliphatic or aromatic, hydrocarbon radical having 2 to 30 carbon atoms, in particular up to 24 carbon atoms, which is optionally further substituted,
$R^4$=independently at each occurrence a hydrogen radical, an alkyl group having 1 to 8 carbon atoms, which may optionally be branched, and/or an unsaturated aliphatic group, preferably <10% hydrogen radical, for example 0.1 to <10% hydrogen radical, reported % based on the entirety of all relevant molecules containing the $R^4$ radical,
$R^5$=hydrogen or methyl group,
wherein
a=1 to 1000, preferably 2 to 500, particularly preferably 3 to 500, more preferably greater than 3 to 100, especially preferably 4 to 50,
b=0 to 1000, preferably 1 to 500, more preferably greater than 1 to 200, especially preferably 0,
with the proviso that the sum of a+b must be not less than 3 and
with the proviso that the groups having the indices a+b are freely permutable over the molecular chain,
and with the proviso that the different monomer units of the fragments with the indices a and b may be in a blockwise structure with one another, wherein individual blocks may also occur multiple times and may be randomly distributed among one another or else are subject to a random distribution and further are freely permutable with one another in the sense that they may be arranged in any desired sequence,
corresponds to a further preferred embodiment.

The invention further provides hydrosilylable polyoxyalkylene ether mixtures comprising compounds of general formulae (1a) and (1b),

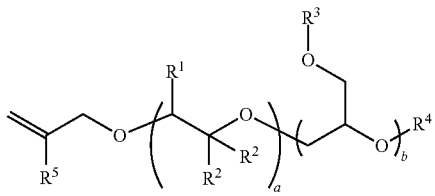

Formula (1a)

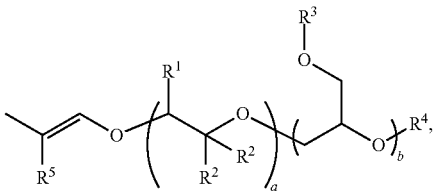

Formula (1b)

where
$R^1$=independently at each occurrence a hydrogen radical or an alkyl group having 1 to 8 carbon atoms, preferably hydrogen, methyl or ethyl, especially preferably hydrogen,
$R^2$=independently at each occurrence a hydrogen radical, an alkyl group having 1 to 20 carbon atoms, an aryl or alkaryl group, preferably hydrogen, methyl, ethyl, octyl, decyl, dodecyl, phenyl, benzyl, particularly preferably hydrogen, methyl or ethyl, or
$R^1$ and one of the $R^2$ radicals may together form a ring which includes the atoms to which $R^1$ and $R^2$ are bonded; this ring preferably comprises 5 to 8 carbon atoms,
$R^3$=independently at each occurrence a saturated or unsaturated, aliphatic or aromatic, hydrocarbon radical having 2 to 30 carbon atoms, in particular up to 24 carbon atoms, which is optionally further substituted,
$R^4$=independently at each occurrence a hydrogen radical, an alkyl group having 1 to 8 carbon atoms, which may optionally be branched, and/or an unsaturated aliphatic group, preferably <10% hydrogen radical, for example 0.1 to <10% hydrogen radical, reported % based on the entirety of all relevant molecules containing the $R^4$ radical,
$R^5$=hydrogen or methyl group,
wherein
a=1 to 1000, preferably 2 to 500, particularly preferably 3 to 500, more preferably greater than 3 to 100, especially preferably 4 to 50,
b=0 to 1000, preferably 1 to 500, more preferably greater than 1 to 200, especially preferably 0,
with the proviso that the sum of a+b must be not less than 3 and
with the proviso that the groups having the indices a+b are freely permutable over the molecular chain,
and with the proviso that the different monomer units of the fragments with the indices a and b may be in a blockwise structure with one another, wherein individual blocks may also occur multiple times and may be randomly distributed among one another or else are subject to a random distribution and further are freely permutable with one another in the sense that they may be arranged in any desired sequence.

These are in particular obtainable by a process as described above.

The invention further provides polyether siloxanes containing hydrosilylable polyoxyalkylene ether mixtures as described above.

The invention further provides for the use of the abovementioned polyether siloxanes as a surface-active substance.

The invention further provides for the use of the abovementioned polyether siloxanes as an additive for ceramic formulations, as an additive in coating compositions, polymeric moulding materials or thermoplastics, as a feed additive, as a wetting agent, as a substrate wetting agent, as a crosslinker, as a thickener, as an additive for polyurethane compounds, in the production of paints, adhesives, as a support for catalysts or in biomedical technology generally or as an added substance for cosmetic formulations and cleaning compositions.

The invention further provides for the use of compositions containing abovementioned polyether siloxanes as an additive for ceramic formulations, as an additive in coating compositions, polymeric moulding materials or thermoplastics, as a feed additive, as a wetting agent, as a substrate wetting agent, as a crosslinker, as a thickener, as an additive for polyurethane compounds, in the production of paints, adhesives, as a support for catalysts or in biomedical technology generally or as an added substance for cosmetic formulations and cleaning compositions.

The subject matter according to the invention was described by way of example below, without any intention to restrict the invention to these illustrative embodiments. When ranges, general formulae or classes of compounds are specified, these are intended to encompass not only the corresponding ranges or groups of compounds which are explicitly mentioned but also all subranges and subgroups of compounds which can be obtained by leaving out individual values (ranges) or compounds. When documents are cited in the context of the present description, the contents thereof, particularly with regard to the subject matter that forms the context in which the document has been cited, are considered in their entirety to form part of the disclosure content of the present invention. Where chemical (empirical) formulae are used in the present invention, the specified indices may be not only absolute numbers but also average values. The indices relating to polymeric compounds are preferably average values. Unless stated otherwise, percentages are figures in percent by weight. If measured values are reported hereinbelow, these measurements, unless stated otherwise, have been conducted under standard conditions (25° C. and 1013 mbar). When average values are reported, the values in question are weight averages unless otherwise stated.

EXPERIMENTAL SECTION

Measurement Methods:

Parameters or measurements are preferably determined using the methods described hereinbelow. In particular, these methods were used in the examples of the present intellectual property right.

The propenyl content of the polyethers/polyether mixtures may be detected by $^1$H-NMR. The signal (doublet) at a chemical shift of (x)=1.5 ppm (corresponds to the CH$_3$ group of the propenyl unit) is related here to the signal (doublet of doublets) at (y)=5.1-5.4 ppm (corresponds to the signal of the CH$_2$ group of the allyl unit) weighted for the number of protons.

The NMR spectra were measured with a Bruker 400 MHz spectrometer using a 5 mm QMP head. Quantitative NMR spectra were measured in the presence of a suitable accelerating agent. The sample to be analysed was dissolved in a suitable deuterated solvent (methanol) and transferred into 5 mm or, if appropriate, 10 mm NMR tubes.

In the context of this invention, weight-average and number-average molecular weights are determined for the produced polyethers by gel permeation chromatography (GPC) calibrated against a polypropylene glycol standard. GPC was performed using an Agilent® 1100 instrument fitted with an RI detector and an SDV 1000/10000 Å column combination consisting of an 0.8×5 cm pre-column and two 0.8×30 cm main columns at a temperature of 30° C. and a flow rate of 1 mL/min (mobile phase: THF). The sample concentration was 10 g/l and the injection volume was 20 µl.

Wet chemistry analysis was performed according to international standard methods: iodine number (IN; DGF C-V 11 a (53); acid number (AN; DGF C-V 2); OH number (ASTM D 4274 C).

The examples adduced hereinafter describe the present invention by way of example, without any intention that the invention, the scope of application of which is apparent from the entirety of the description and the claims, be restricted to the embodiments specified in the examples.

Example 1

Inventive Example 1.1 Alkoxylation According to Process Step (1) of the Process According to the Invention In a 5 L autoclave 337 g of allyl alcohol and 11 g of sodium methoxide were initially charged under nitrogen and evacuated to an internal pressure of 30 mbar. With stirring the reaction mixture was heated to 120° C. and at this temperature 2652 g of ethylene oxide (EO) were added onto the allyl alcohol. After quantitative conversion of the EO the reactor contents were deodorized by evacuation to 30 mbar to remove any traces of unconverted EO present. The analytical values for the product from example 1.1 are reported in table 1.

1.2 Etherification According to Process Step (2) of the Process According to the Invention A stirred reactor with temperature and pressure control is filled under nitrogen with 1081 g of the product from example 1.1. 96 g (115 mol %) of sodium hydroxide powder are then added and the mixture is heated to 120° C. with stirring. Simultaneously the reactor is evacuated and water is distilled off until a pressure of 20 mbar is established (about 2.5 h). 108 g of methyl chloride are then added at 120° C. in such a way that the pressure does not exceed 1.0 bar (about 1 h). In what follows the reactor is evacuated to about 20 mbar. At the same temperature 24 g of methyl chloride are metered in over about 1 h. After a postreaction time of about 0.5 h the product is degassed at 95° C. and 20 mbar.

1.3 Buffered Workup According to Process Step (3) of the Process According to the Invention The product from Example 1.2 (1081 g) is heated to 100° C. and 500 g of water are added. Subsequently 12.1 g of (about 45%) sodium dihydrogenphosphate solution are added and the mixture is stirred for 1 h. Dilute phosphoric acid (30%) is then added until a pH of 5 is attained. The water is distilled off at 100° C. and 10 mbar and the product is freed from salt residues by filtration. A colourless to yellowish product having the physical parameters summarized in table 1 is obtained. The analytical values before/after etherification are likewise reported in table 1.

Example 2

Comparative Example

The product from example 1.1 was converted as per example 1.2 and worked up as follows.

2.3 Unbuffered Workup 1184 g of a product produced as per example 1.2 are heated to 100° C. and 550 g of water are added. Dilute phosphoric acid (30%) is then added until a pH of 5 is attained. The water is distilled off at 100° C. and 10 mbar and the product is freed from salt residues by filtration. A colourless to yellowish product having the physical parameters summarized in table 1 is obtained.

Example 3

Inventive Example 3.1 Alkoxylation According to Process Step (1) of the Process According to the Invention The alkoxylation was performed as per example 1.1, wherein a mixture of 42 wt % of EO and 58 wt % of PO was added onto the starter allyl alcohol to afford a polyether having a molecular weight of about 1300 g/mol. A colourless to yellowish product having the physical parameters summarized in table 1 is obtained.

3.2 Etherification According to Process Step (2) of the Process According to the Invention The etherification of the polyether from example 3.1 was performed as per example 1.2. A colourless to yellowish product having the physical parameters summarized in table 1 is obtained.

3.3 Buffered Workup According to Process Step (3) of the Process According to the Invention The buffered workup of the polyether from example 3.2 was performed as per example 1.3 A colourless to yellowish product having the physical parameters summarized in table 1 is obtained.

Example 4

Comparative Example

The product from example 3.1 was converted as per example 3.2.

4.3 Unbuffered Workup

The unbuffered workup was effected as per example 2.3. A colourless to yellowish product having the physical parameters summarized in table 1 is obtained.

TABLE 1

Physical data for examples 1-4

| Example | Propenyl content [mol %] | Iodine number [g iodine/100 g] | OH number [mg KOH/g] | Acid number [mg KOH/g] |
|---|---|---|---|---|
| 1.1 = 2.1 | 1.2 | 50.3 | 108 | −3.5 |
| 1.2 = 2.2 | 2.9 | n.d | n.d | n.d |
| 1.3 | 2.9 | 46.5 | 6.5 | 0.2 |
| 2.3 | 0 | 45.5 | 7.5 | 0.2 |
| 3.1 = 4.1 | 1.4 | 18.0 | 43.0 | −4.1 |
| 3.2 = 4.2 | 4.3 | n.d | n.d | n.d |
| 3.3 | 4.3 | 17.5 | 2.5 | 0.10 |
| 4.3 | 0 | 17.0 | 3.0 | 0.18 |

The reactivity of the propenyl-containing polyether in the context of an SiC linkage was tested with reference to Pt-catalysed hydrosilylation of the polyethers produced by the process according to the invention onto heptamethyltrisiloxane (HMTS; CAS number: 1873-88-7).

Example 5

Hydrosilylation of the Polyether from Example 1.3 onto HMTS

In a 1 L three-necked flask having a thermometer, reflux cooler and KPG stirrer, 435.1 g of the polyether from example 1.3 were heated to 75° C. and at this temperature admixed with 74 mg of a solution of Karstedt catalyst (CAS number: 68478-92-2) in toluene (1.5% Pt). 120 g of HMTS (SiH value=5.11 eq/kg) were then added dropwise such that the temperature did not exceed 90° C. Once HMTS addition was complete the mixture was stirred at 90° C. until the SiH conversion was virtually quantitative (>99%).

Conversion was determined by gas-volumetric determination of the SiH value of the reaction mixture (decomposition of a weighed-in sample in a gas burette using a sodium butoxide solution). The conversion profile is summarized in Table 2. A yellowish, clear liquid was obtained as product.

Example 6

Hydrosilylation of the Polyether from Example 2.3 onto HMTS

In a 1 L three-necked flask having a thermometer, reflux cooler and KPG stirrer, 454.1 g of the polyether from example 2.3 were heated to 75° C. and at this temperature admixed with 77 mg of a solution of Karstedt catalyst (CAS number: 68478-92-2) in toluene (1.5% Pt). 125 g of HMTS (SiH value=5.01 eq/kg) were then added dropwise such that the temperature did not exceed 90° C. Once HMTS addition was complete the mixture was stirred at 90° C. until the SiH conversion was virtually quantitative (>99%).

Conversion was determined by gas-volumetric determination of the SiH value of the reaction mixture (decomposition of a weighed-in sample in a gas burette using a sodium butoxide solution). The conversion profile is summarized in Table 2. Since quantitative conversion could not be reported even after 6 h a further 38 mg of the catalyst solution were added. After a further stirring time of 1 h the target conversion was finally attained and a yellowish, clear liquid was obtained as product.

Example 7

Hydrosilylation of the Polyether from Example 3.3 onto HMTS

Example 7 was performed as per example 5 with identical stoichiometry of HMTS to polyether from example 3.3.

Example 8

Hydrosilylation of the Polyether from Example 4.3 onto HMTS

Example 8 was performed as per example 6 with identical stoichiometry of HMTS to polyether from example 4.3.

TABLE 2

Conversion profile of hydrosilylation of the polyether mixtures from examples 1.3, 2.3, 3.3 and 4.3.

| Example | Conversion [mol %] after | | | | | | |
| | 1 h | 2 h | 3 h | 4 h | 5 h | 6 h | 7 h |
|---|---|---|---|---|---|---|---|
| 5 | 64 | 76 | 92 | 98 | >99 | — | — |
| 6 | 45 | 55 | 63 | n.d | n.d | 83 | >99 |
| 7 | 46 | 71 | 88 | n.d | 88 | >99 | |
| 8 | 52 | 72 | 78 | n.d | 89 | 95 | >99 |

Surprisingly, the propenyl-containing polyethers according to the invention are markedly more reactive than prior art polyethers in the context of the SiC linking hydrosilylation reaction onto SiH-functional siloxanes.

The invention claimed is:

1. A process for producing hydrosilylable polyoxyalkylene ethers, comprising the steps of
   (1) alkoxylation of at least one terminally unsaturated alcohol with alkylene oxides to afford a polyoxyalkylene ether,
   (2) etherification of the polyoxyalkylene ether from step (1) and
   (3) neutralization of the product from step (2) under buffered conditions.

2. The process according to claim 1, wherein in step (3) the product from step (2) is admixed with a buffer solution before the acid addition.

3. The process according to claim 1, wherein step (3) is performed in the presence of water.

4. The process according to claim 1, wherein the buffer solution has a buffering range between pH 3.5 and 9.0.

5. The process according to claim 1, wherein the buffer solution comprises phosphate as the buffer substance.

6. The process according to claim 1 for producing mixtures of hydrosilylable polyoxyalkylene ethers comprising hydrosilylable propylene-containing polyoxyalkylene ethers.

7. The process according to claim 1 for producing hydrosilylable polyoxyalkylene ether mixtures comprising compounds of general formulae (1a) and (1b), Formula (1a)

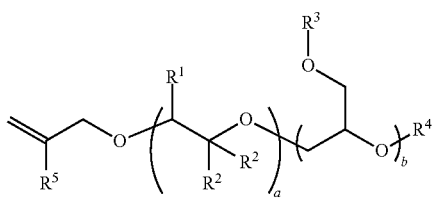

Formula (1b)

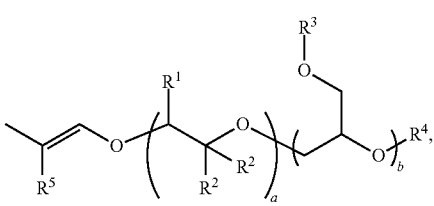

where
R1 is independently at each occurrence a hydrogen radical or an alkyl group having 1 to 8 carbon atoms,
R2 is independently at each occurrence a hydrogen radical, an alkyl group having 1 to 20 carbon atoms, an aryl or alkaryl group, or
R1 and one of the R2 radicals may together form a ring which includes the atoms to which R1 and R2 are bonded;
R3 is independently at each occurrence a saturated or unsaturated, aliphatic or aromatic, hydrocarbon radical having 2 to 30 carbon atoms, which is optionally further substituted,
R4 is independently at each occurrence a hydrogen radical, an alkyl group having 1 to 8 carbon atoms, which may optionally be branched, and/or an unsaturated aliphatic group, preferably <10% hydrogen radical, reported % based on the entirety of all relevant molecules containing the R4 radical,
R5 is hydrogen or methyl group,
wherein
a is from 1 to 1000,
b is from 0 to 1000, preferably 1 to 500,
with the proviso that the sum of a+b must be not less than 3 and
with the proviso that the groups having the indices a+b are freely permutable over the molecular chain,
and wherein the different monomer units of the fragments with the indices a and b may be in a blockwise structure with one another, wherein individual blocks may also occur multiple times and may be randomly distributed among one another or else are subject to a random distribution and further are freely permutable with one another in the sense that they may be arranged in any desired sequence.

8. The process according to claim 1, wherein the buffer solution comprises hydrogenphosphate and/or dihydrogenphosphate.

9. The process according to claim 4, wherein the buffer solution comprises hydrogenphosphate and/or dihydrogenphosphate.

10. The process according to claim 7 wherein
R1 is independently at each occurrence selected from the group consisting of hydrogen, methyl or ethyl,
R2 is independently at each occurrence selected from the group consisting of hydrogen, methyl, ethyl, octyl, decyl, dodecyl, phenyl, benzyl, or
R1 and one of the R2 radicals may together form a ring which includes the atoms to which R1 and R2 are bonded, wherein the ring comprises 5 to 8 carbon atoms,
R3 is independently at each occurrence a saturated or unsaturated, aliphatic or aromatic, hydrocarbon radical having 2 to 24 carbon atoms, and
R4 is independently at each occurrence less than 10% hydrogen radical reported % based on the entirety of all relevant molecules containing the R4 radical, an alkyl group having 1 to 8 carbon atoms.

11. The process according to claim 7 wherein
R1 is hydrogen and
R2 is selected from the group consisting of hydrogen, methyl and ethyl.

12. The process according to claim 7 wherein
a is from 3 to 100, and
b is from 1 to 500.

13. The process according to claim 7 wherein
a is from 3 to 500, and
b is from 1 to 200.

14. The process according to claim 7 wherein
a is from 4 to 50, and
b is 0.

* * * * *